United States Patent [19]

Ellis

[11] Patent Number: 4,828,378
[45] Date of Patent: May 9, 1989

[54] NIGHT VISION VIEWING SYSTEMS

[75] Inventor: Stafford M. Ellis, East Preston, England

[73] Assignee: GEC-Marconi Limited, England

[21] Appl. No.: 96,937

[22] Filed: Sep. 15, 1987

[30] Foreign Application Priority Data

Sep. 17, 1986 [GB] United Kingdom ............... 8622378

[51] Int. Cl.⁴ ...................... G02B 23/00; G02B 27/02
[52] U.S. Cl. ..................................... 350/538; 350/145
[58] Field of Search ............... 350/538, 539, 540, 174, 350/567, 574, 503, 545, 131, 145, 601

[56] References Cited

U.S. PATENT DOCUMENTS

| | | | |
|---|---|---|---|
| 3,549,231 | 12/1970 | Scidmore et al. | 350/52 |
| 3,923,370 | 12/1975 | Mostrom | 350/55 |
| 4,000,419 | 12/1976 | Crost et al. | 250/213 VT |
| 4,124,798 | 11/1978 | Thompson | 250/213 VT |
| 4,361,384 | 11/1982 | Bosserman | 350/174 |
| 4,653,879 | 3/1987 | Filipovich | 350/538 |

FOREIGN PATENT DOCUMENTS

| | | |
|---|---|---|
| WO86/05281 | 9/1986 | PCT Int'l Appl. |
| WO87/00639 | 1/1987 | PCT Int'l Appl. |
| 1264343 | 2/1972 | United Kingdom |
| 1433333 | 4/1976 | United Kingdom |
| 1493885 | 11/1977 | United Kingdom |
| 2006463 | 5/1979 | United Kingdom |
| 2044476 | 10/1980 | United Kingdom |
| 2100466 | 12/1982 | United Kingdom |
| 2108702 | 5/1983 | United Kingdom |
| 2144558 | 3/1985 | United Kingdom |
| 2155762 | 10/1985 | United Kingdom |
| 2168595 | 6/1986 | United Kingdom |

OTHER PUBLICATIONS

"Optical Engineering", Nov./Dec. 1974, pp. 6233-6234.

Primary Examiner—John K. Corbin
Assistant Examiner—Ronald M. Kachmarik
Attorney, Agent, or Firm—Kirschstein, Kirschstein, Ottinger & Israel

[57] ABSTRACT

A night vision viewing system, suitable for mounting on an observer's headgear (11), wherein light rays from a forward scene pass to the observer's eye (E) via a path comprising a forward looking objective lens (23), an inclined reflector (35) which directs the rays passing through the objective onto an outwardly sideways looking input face of an image intensifier (31), and a fibre optic stub (33) which directs rays from the output face of the intensifier onto a second reflector (27) which directs the rays downwardly into an eyepiece (21) which is in the observer's forward line of sight. The eyepiece incorporates an internal surface (37) having both light reflective and light transmissive properties which directs rays entering the eyepiece from the intensifier to the observer's eye. The fibre optic stub serves to effect rotation of the intensified image to present an intensified image of correct orientation to the observer.

8 Claims, 6 Drawing Sheets

NIGHT VISION VIEWING SYSTEMS

BACKGROUND OF THE INVENTION

1. Field of the Invention

This invention relates to night vision viewing systems.

More particularly, the invention relates to night vision viewing systems of a kind suitable for support on headgear to provide a wearer of the headgear with an intensified view of a scene ahead of the wearer superimposed on and in register with the wearer's direct view of said scene.

2. Description of Related Art

A known such system comprises an eyepiece arranged to intercept a forward line of sight of an observer using the system and an optical sub-system including a forward looking objective lens fixed with respect to said eyepiece and having an optical axis offset with respect to said forward line of sight, and an image intensifier means disposed optically between said objective lens and said eyepiece so that light rays of an intensified real image of a scene forward of the observer viewed by said objective lens are directed into said eyepiece via an input surface thereof, thereby to provide the observer with a view of said intensified image which is superimposed on and in register with the observer's direct view of said forward scene through said eyepiece.

Such a night vision viewing system is hereinafter referred to as a night vision viewing system of the kind specified.

Known night vision viewing systems in which the system is supported on headgear have certain inherent shortcomings when used in environments such as the cockpit of a high performance aircraft. Inevitably the centre of gravity of the night vision system is at a position forward of the neck pivot position of the headgear wearer. The weight of the night vision system is, generally speaking, of the order of 2 lbs; and, heretofore the moment arm about the neck pivot position has been around five inches. In static conditions therefore the user must develop a balancing torque of about 10 pounds inches. Under high gravitational force manoeuvre conditions any unbalanced mass of quite small magnitude may constitute a danger to the wearer.

SUMMARY OF THE INVENTION

It is an object of the present invention to provide a night vision viewing system of the kind specified wherein these shortcomings are alleviated.

According to the present invention, in a night vision viewing system of the kind specified said image intensifier means is arranged so as to be sideways looking with respect to said forward line of sight.

Preferably said light rays are directed downwardly from said sub-system onto said input surface, said input surface being an upper surface of the eyepiece.

In one particular system in accordance with the invention said optical sub-system further includes a first light reflecting means supported above said input surface of the eyepiece which serves to direct light rays received from an output face of said image intensifier means onto said input surface; and a second light reflecting means which serves to direct light rays received from said forward scene via said objective lens onto an input face of said image intensifier means. In such a system image rotation means is preferably provided between said output face and said first light reflecting means. Said image rotation means suitably comprises a coherent fibre optic stub optically connected at one end to said output face.

In one particular embodiment of said particular system in accordance with the invention said first light reflecting means has light transmitting properties as well as light reflecting properties, and the system includes means for displaying a real image at a position from which light rays can pass via said reflecting means into said eyepiece via said input surface for viewing by the observer.

In a night vision viewing system according to the invention said image intensifying means is preferably arranged to be outwardly looking with respect to the observer's forward line of sight through said eyepiece.

The invention also provides a night vision viewing system comprising two night vision viewing systems according to the invention, one for each eye of the observer.

In a night vision viewing system in accordance with the invention the or each eyepiece is preferably of the kind comprising a body of light refractive material having: a substantially flat upper input surface via which said rays enter the eyepiece; fore and aft substantially flat surfaces spanned by said input surface; and an internal surface between said fore and aft surfaces which is concavely curved towards said aft surface and which possesses both light reflecting and light transmitting properties; said input, fore, aft and internal surfaces being angularly mutually disposed so that said rays from said intensified real image, after entering said body, are internally reflected forwardly towards said internal surface, are reflected at said internal surface rearwardly towards said aft surface, and finally are transmitted through said aft surface to an observer's design eye position.

Such an eyepiece is hereafter referred to as an eyepiece of the kind specified.

Night vision viewing systems incorporating eyepieces of the kind specified are described in GB-A-No. 2108702 and GB-A-No. 2144558.

In GB-A-No. 2108702 the eyepiece is in two parts; the internal surface is in the form of a coating of appropriate light transmissive and light reflective properties at a curved interface formed by complementary convexly and concavely curved surfaces of the two parts. In such an eyepiece, rays entering the refractive body at the upper surface are totally internally reflected at the aft surface.

In GB-A-No. 2144558 the eyepiece is in three parts, there being two internal surfaces one of which is the said surface concavely curved towards the aft surface and the other of which is a substantially flat surface between the concavely curved internal surface and the aft surface. With this eyepiece light rays entering the body at the upper surface are totally internally reflected at the said other internal surface towards the concavely curved surface and are there reflected rearwardly for transmission through said other internal surface and then said aft surface to the observer's eye.

The eyepieces of the night vision viewing systems of GB-A-No. 2108702 and GB-A-No. 2144558 are functionally similar, but the eyepiece of GB-A-No. 2144558 may be made substantially more compact than that of GB-A-No. 2108702 the latter eyepiece having, in the context of headgear systems at least, a substantial angle of rake to its fore and aft surfaces, as a result of its two-part construction. In the eyepiece of GB-A-No. 2144558 a much smaller angle of rake of the fore and aft surfaces may be achieved and the eyepiece may be brought closer to the eye position. Accordingly, a larger field of view may be so obtained, retaining the overall dimensions in the eyepieces; or (perhaps more important) a smaller eyepiece may be employed to achieve a field of view equivalent to that obtainable with a substantially larger eyepiece of the two-part construction of GB-A-No. 2108702.

Thus an eyepiece of the kind described in GB-A-No. 2144558 is in general preferred for use in a system according to the present invention.

It should be understood that whilst the several said surfaces of an eyepiece of the kind specified are stated to be substantially flat it may be convenient or advantageous to give these surfaces or any of them a degree of curvature in order to ameliorate optical defects necessarily present in the system. Astigmatism, in particular, must be present; the off-axis nature of system in which the eyepiece is employed makes this unavoidable. Accordingly references, in this specification, to flat surfaces, should be construed with the foregoing in mind, it being a matter of preference and not of the essence that the said surfaces should be other than flat since corrective optical elements could be located at other places in the optical system.

The combined effect of the several elements employed in a night vision system according to the invention is such that the system is of minimal weight and of minimal moment arm about the neck pivot position.

BRIEF DESCRIPTION OF THE DRAWINGS

One night vision viewing system in accordance with the invention for use by the pilot of a high performance aircraft supported on the pilot's helmet will now be described, by way of example, with reference to the accompanying drawings, in which.

DETAILED DESCRIPTION OF THE PREFERRED EMBODIMENTS

Figure 1:
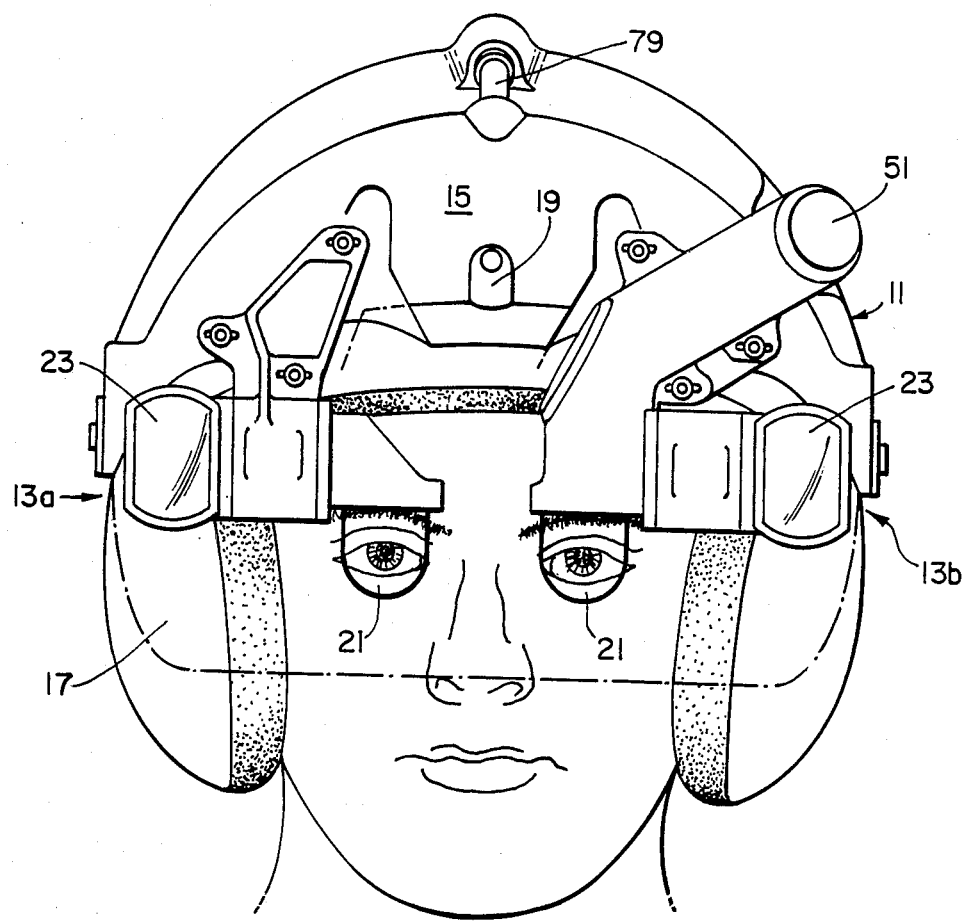
FIG. 1 is a pictorial front elevation of the system.

Referring to the drawings, the system is mounted on a helmet 11 and is a binocular night vision system comprising two night vision systems 13a, 13b, one for each eye of the wearer of the helmet 11.

The night vision viewing systems 13a, 13b are secured to a cowl portion 15 of the helmet 11 which is pivotally connected at a transverse axis to the helmet 11 and from which a vizor 17 is dependant. The angular position of the cowl 15, and hence the vizor 17 and the systems 13a, 13b is adjustable on release of a catch 19.

The night vision systems 13a, 13b, each comprise an eyepiece 21, a forward looking objective lens 23, and an optical sub-system 25 which comprises a first inclined reflector 27, an image intensifier 31, a coherent fibre optic stub 33 having one of its ends connected to the output face of the image intensifier 31 with an optical cement, and a second inclined reflector 35.

The eyepiece 21 consists of light reflective material, preferably a transparent plastics material, and includes an internal surface 37 having both light transmissive and light reflective properties. The surface 37 is at the interface between two parts A and B of eyepiece 21, one part A having an optically flat upper surface 39 which constitutes a first input surface of the eyepiece 21, an optically flat aft surface 41 and a fore surface concavely curved towards the aft surface 41, which fore surface is bonded to a complementary aft surface of the part B to form the surface 37, said other part B having an optically flat fore surface 43 which constitutes a second input face of the eyepiece 21. The eyepiece 21 is completed by a third wedge shaped part C having a fore major surface 45 in parallel spaced relation to the surface 41 and an aft major face 47 parallel to the surface 43.

The required optical properties at the surface 37 are suitably conferred by a semi-silvered mirror coating or a holographic coating.

The inclined reflector 27 is supported above the upper surface 39 of the eyepiece 21. The image intensifier 31 is laterally positioned with respect to the reflector 27 and is sideways outwardly looking, i.e. rightwards for the right eye system 13a and leftwards for the left eye system 13b. The second inclinded reflector 35 is at the intersection of the optical axis of the objective 23 and the longitudinal axis of the image intensifier 31.

In operation of the binocular night vision system rays from a forward distant scene, represented by the upper case letter F in the drawings, are received at the objective lens 23 of each of the component night vision systems 13a, 13b, and are brought to a focus as an inverted image of the scene at an image place coincident with the input face of the image intensifier 31 by reflection from the said second reflector 35.

An intensified representation of the said inverted image is developed at the output face of the intensifier 31 and transmitted through the coherent fibre optic stub 33 to the reflector 27.

The reflector 27 is at the intersection of the longitudinal axis of the fibre optic stub 33 and a direction normal to the upper surface 39 of the eyepiece 21.

The position of the free end face 49 of the fibre optic stub 33 is coincident with the focal plane of concavely curved surface 37 within the eyepiece 21. Rays from the end face 45, after reflection at inclined reflector 27, enter the eyepiece 21 via the surface 37 and are totally internally reflected at the surface 41 of the eyepiece towards the curved surface 37. The rays incident on the surface 37 from the surface 41 are reflected backwards to be transmitted through the surface 41 and then the rear part C of the eyepiece 21 to a design eye position E.

Since the ray originate, so far as the eyepiece 21 is concerned, at the principal focal plane of the eyepiece 21 on intensified virtual image of the forward scene as viewed through the objective lens 23 is seen at the design eye position.

The fibre optic stub 33 is of a twisted construction, the angle of twist being such that the combined optical effect of the stub 33, the reflector 27 and the eyepiece 21 on rays from the intensified but inverted representation at the intensifier output face of the forward distant scene F is such that a virtual erect image of the intensified representation is seen at the design eye position E. Moreover, because of the collimation effected in the system, essentially by the curved surface 37, the erect virtual intensified image, by virture of the parallel relationship of the eyepiece overall fore and aft surfaces 43 and 47, is in register with the view from the eye position E of the forward distant scene directly through the eyepiece 21 provided by light rays from the scene passing through the eyepiece 21 via surfaces 43, 37, 41, 43, 45 and 47, in turn.

In practice the image rotation required in the stub 33 is of the order of 90°, the precise angle being determined by the detailed configuration.

Figure 2:
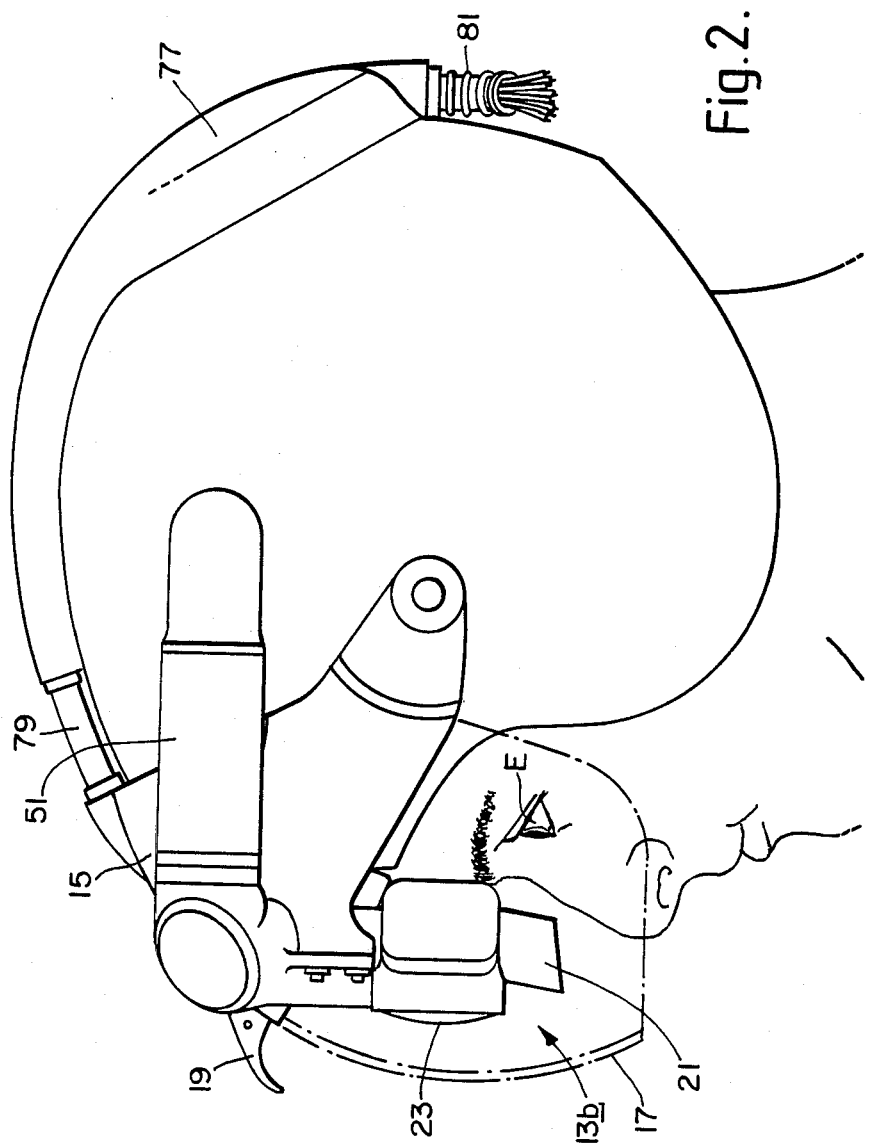
FIG. 2 is a pictorial side elevation of the system.
Figure 3:
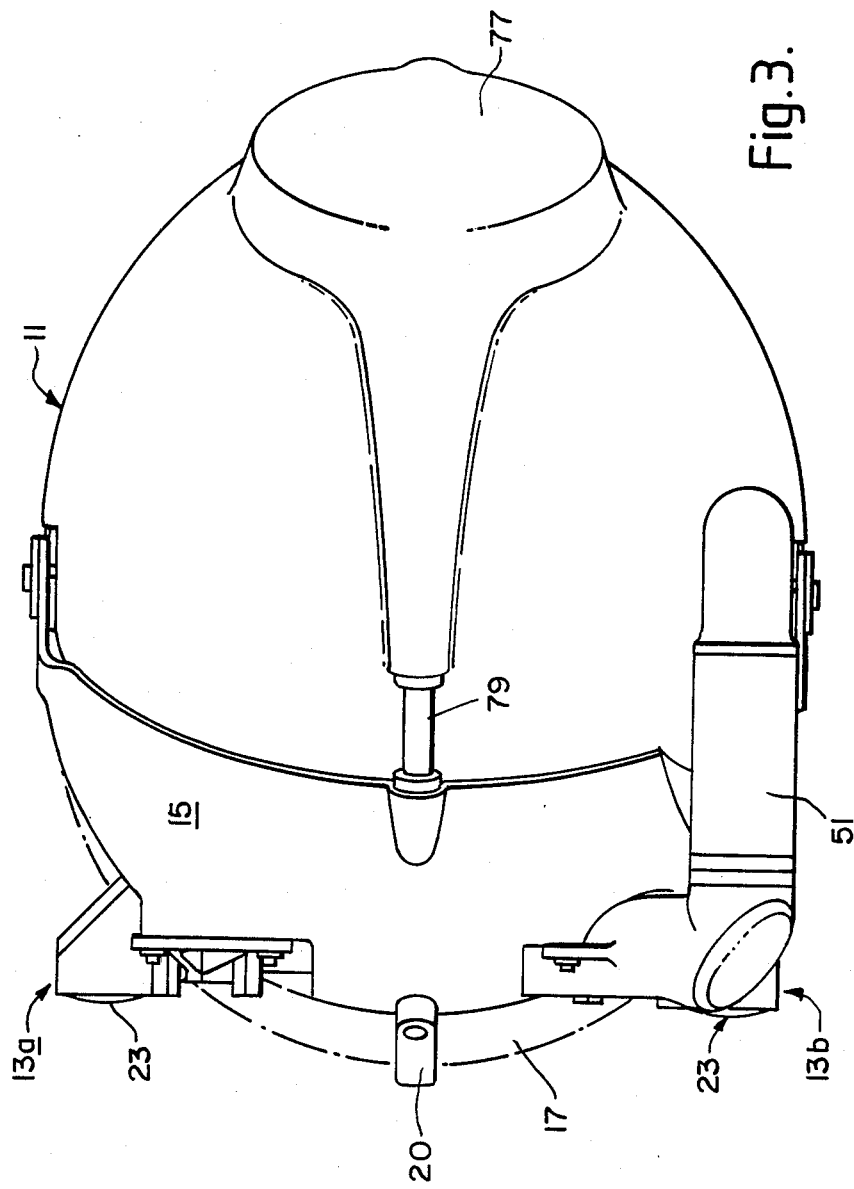
FIG. 3 is a pictorial plan view of the system.
Figure 4:
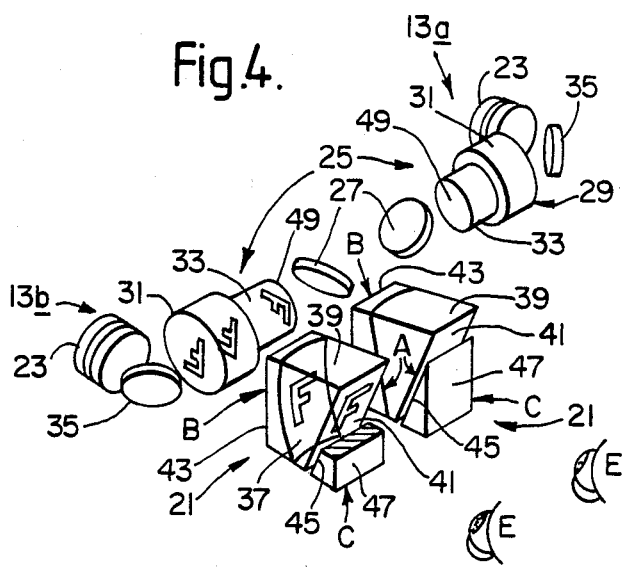
FIG. 4 is a diagram illustrating the optical arrangement of the system.

The system further includes a display arrangement of presenting further optical data to one eye of the helmet wearer, superimposed on the direct and intensified views of the distant scene, the casing of the arrangement being referenced 51 in FIGS. 1, 2 and 3.

Figure 5:
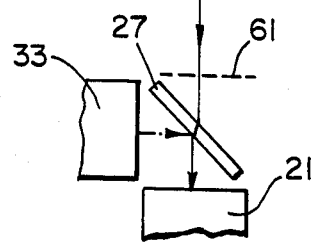
FIG. 5 is a pictorial representation of the optical arrangement of a display arrangement incorporated in the system.

Referring to FIG. 5, the arrangement comprises a cathode ray tube (CRT) 53 and a relay lens arrangement 55 comprising two spaced lens groups 57a, and 57b and a reflector 59 between the said two spaced lens groups 57a, 57b, for bending the optical path between the lens groups 57a, 57b.

The display arrangement forms a real image of luminous optical data presented at the screen of the CRT 53 at image plane 61 above the reflector 27 of the night vision viewing system 13b. The reflector 27 has light transmissive properties, as well as light reflective properties, so that light rays from the image plane 61 pass through the reflector 27 to enter the eyepiece 21 of the night vision viewing system 13b via its surface 39, thereby presenting a collimated virtual image of the CRT screen display at the design eye position E for the helmet wearer's left eye. It will be understood in this connection that the optical path length from the image plane 61 to the eyepiece internal curved surface 37 is the same as the optical path length from the free end face 49 of the fibre optic stub 33 to the surface 37 to preserve the collimated character of the display.

Figure 6:
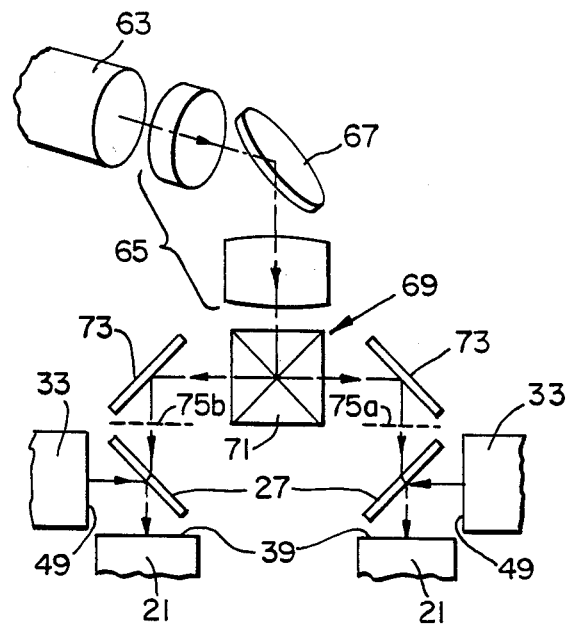
FIG. 6 is a pictorial representation of the optical arrangement of an alternative form of the display arrangement.

The display arrangement may be a biocular one, as depicted in FIG. 6, instead of a monocular one. In the arrangement of FIG. 6 rays from a single CRT 63 transmitted by a relay lens arrangement 65 and intermediate reflector 67 are received by a prism arrangement 69 composed of four prism elements 71 having semi-silvered coatings at their interfaces. Two full reflectors 73 are disposed laterally with respect to the prism arrangement 69, one on either side thereof, to reflect rays projected outwards from the prism arrangement downwards to respective image planes 75a and 75b respectively located above the reflectors 27 of the two night vision systems 13a and 13b, both reflectors 27 having light transmissive as well as light reflective properties so that a collimated virtual image of the CRT screen display is presented to each eye of the helmet wearer.

It is known to counter-balance, at least to a first order, the first and second moments of helmet mounted night vision viewing systems by counter weights disposed at the rear of the helmet shell. It is known to utilise, as far as practicable, system elements such as power supplies, cables and so on for this purpose.

The embodiment of the present invention shown in the drawings follows this practice. To this end helmet 17 has at it rear a compartment 77 housing the image intensifier power supplies, batteries and so on (not shown), and CRT drive and control electronic circuitry (not shown). Cabling 79 extends from the compartment 77 to the binocular night vision system and cabling 81 links the electronics in the compartment 77 to electronic circuitry, e.g. a signal processor (not shown), not mounted on the helmet 11, for generating the signals required to display optical data on the screen of the CRT 53 or 63 of the display arrangement.

The configuration of a binocular night vision system according to the invention, particular in respect of the position of the or each image intensifier and when using an eyepiece or eyepieces of the kind specified, offers the possibility of achieving an optimal centre of gravity position in relation to the neck pivot position of a user of the system. Moreover, the weight of the system is low by comparison with known systems offering a similar angular field of view.

It will be understood that whilst the system described by way of example is a binocular night vision viewing system other systems in accordance with the invention may comprise a biocular night vision system, or a monocular night vision system leaving the other eye of the user by uninterrupted view of the forward distant scene, e.g. through the vizor 17. Similarly a display arrangement for optical data need not be provided in a night vision viewing system in accordance with the invention.

I claim:
1. A night vision viewing system comprising:
   (a) an eyepiece arranged to intercept a forward line of sight of an eye of an observer using the system;
   (b) an optical sub-system including a forward looking objective lens fixed with respect to said eyepiece and having an optical axis offset with respect to said forward line of sight;
   (c) an image intensifier means disposed optically between said objective lens and said eyepiece so that light rays of an intensified real image of a scene forward of the observer viewed by said objective lens are directed downwardly into said eyepiece via an upper input surface thereof, thereby to provide the observer with a view of said intensified image which is superimposed on and in register with the observer's direct view of said forward scene through said eyepiece;
   (d) said image intensifier means being positioned above, and on that side of, said forward line of sight which is remote from the other eye of the observer, and has an optical axis extending substantially horizontally and transversely to said forward line of sight;
   (e) said optical sub-system further including
      (i) a first light reflecting means supported above said input surface of the eyepiece which serves to direct light rays received from an output face of said image intensifier means onto said input surface, and
      (ii) a second light reflecting means for directing light rays received from said forward scene via said objective lens onto an input face of said image intensifier means.

2. A system according to claim 1 including image rotation means between said output face and said first light reflecting means.

3. A system according to claim 2 wherein said image rotation means comprises a coherent fibre optic bundle stub optically connected to one end to said output face.

4. A system according to claim 1 wherein said first light reflecting means has light transmitting properties as well as light reflecting properties, and the system includes means for displaying a real image at a position from which light rays can pass via said first reflecting means into said eyepiece via said input surface for viewing by the observer.

5. A system according to claim 1 wherein said eyepiece comprises a body of light refractive material having: a substantially flat upper input surface via which said rays enter the eyepiece; fore and aft substantially flat surfaces spanned by said input surface; and an internal surface between said fore and aft surfaces which is concavely curved towards said aft surface and which possesses both light reflecting and light transmitting properties; said input, fore, aft and internal surfaces being angularly mutually disposed so that said rays from said intensified real image, after entering said body, are internally reflected forwardly towards said internal surface, and finally are transmitted through said aft surface to an obsever's design eye position.

6. A system according to claim 5 wherein said eyepiece has two internal surfaces one of which is said internal surface concavely curved towards said aft surface and the other of which is a substantially flat surface between said concavely curved internal surface and said aft surface; said input, fore, aft and two internal surfaces being angularly mutually disposed so that light rays from said intensified image, after entering said body, are internally reflected forwardly at said other internal surface, and are then reflected at said one internal surface rearwardly for transmission through said other internal surface and then said aft surface to the observer's design eye position.

7. A night vision viewing system comprising headgear for wear by an observer using the system and a viewing system secured to the headgear and comprising:

(a) an eyepiece arranged to intercept a forward line of sight of an eye of the observer when wearing the headgear;
(b) an optical sub-system including a forward looking objective lens fixed with respect to said eyepiece and having an optical axis offset with respect to said forward line of sight;
(c) an image intensifier means disposed optically between said objective lens and said eyepiece so that light rays of an intensified real image of a scene forward of the observer viewed by said objective lens are directed downwardly into said eyepiece via an upper input surface thereof, thereby to provide the observer with a view of said intensified image which is superimposed on and in register with the observer's direct view of said forward scene through said eyepiece;
(d) said image intensifier means being positioned above, and on that side of, said forward line of sight which is remote from the other eye of the observer, and has an optical axis extending substantially horizontally and transversely to said forward line of sight;
(e) said optical sub-system further including
 (i) a first light reflecting means supported above said input surface of the eyepiece which serves to direct light rays received from an output face of said image intensifier means onto said input surface, and
 (ii) a second light reflecting means for directing light rays received from said forward scene via said objective lens onto an input face of said image intensifier means.

8. A night vision viewing system according to claim 7 including two said viewing systems, one for each eye of the observer.

* * * * *